US012002354B2

United States Patent
Hayashi et al.

(10) Patent No.: US 12,002,354 B2
(45) Date of Patent: Jun. 4, 2024

(54) VEHICLE SYSTEM

(71) Applicant: SUBARU CORPORATION, Tokyo (JP)

(72) Inventors: Tatsuya Hayashi, Tokyo (JP); Toshiya Godai, Tokyo (JP); Kazuhiro Nagae, Tokyo (JP); Norio Iwabuchi, Tokyo (JP); Katsuo Senmyo, Tokyo (JP); Hiroyuki Tahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 185 days.

(21) Appl. No.: 16/998,215

(22) Filed: Aug. 20, 2020

(65) Prior Publication Data

US 2021/0090432 A1  Mar. 25, 2021

(30) Foreign Application Priority Data

Sep. 25, 2019  (JP) .................................. 2019-173942

(51) Int. Cl.
*B60W 40/09* (2012.01)
*B60W 50/10* (2012.01)
(Continued)

(52) U.S. Cl.
CPC ............. *G08G 1/017* (2013.01); *B60W 40/09* (2013.01); *G06N 20/00* (2019.01); *H04W 4/44* (2018.02); *B60W 50/10* (2013.01)

(58) Field of Classification Search
None
See application file for complete search history.

(56) References Cited

U.S. PATENT DOCUMENTS

2014/0350789 A1* 11/2014 Anker ................. B60W 50/082
                                                            701/41
2016/0080500 A1* 3/2016 Penilla ............. B60W 50/0098
                                                            709/226
(Continued)

FOREIGN PATENT DOCUMENTS

JP  2009-276994 A  11/2009
JP  2018-169705 A  11/2018
(Continued)

OTHER PUBLICATIONS

Notice of Reasons for Refusal issued in Japanese Patent Application No. 2019-173942 dated May 9, 2023, with machine translation.

*Primary Examiner* — Maceeh Anwari
*Assistant Examiner* — Charles Pall
(74) *Attorney, Agent, or Firm* — TROUTMAN PEPPER HAMILTON SANDERS LLP

(57) ABSTRACT

A vehicle system includes an information storage, an information acquirer, a vehicle characteristics extractor, and a vehicle characteristics transmitter. The information storage stores vehicle information of sample vehicles in association with the sample vehicles. The vehicle information is obtained by combining a traveling location or a traveling environment, or both, with vehicle characteristics. The information acquirer acquires vehicle information of a target vehicle and either of both of a first traveling location and a first traveling environment for which vehicle characteristics for the target vehicle are lacking. The vehicle characteristics extractor determines a sample vehicle of which vehicle information matches the vehicle information of the target vehicle and extracts vehicle characteristics of the sample vehicle corresponding to either or both of the first traveling location and the first traveling environment. The vehicle (Continued)

characteristics transmitter transmits the extracted vehicle characteristics to the target vehicle.

4 Claims, 7 Drawing Sheets

(51) Int. Cl.
*G06N 20/00* (2019.01)
*G08G 1/017* (2006.01)
*H04W 4/44* (2018.01)

(56) References Cited

U.S. PATENT DOCUMENTS

| | | | |
|---|---|---|---|
| 2016/0265923 A1* | 9/2016 | Fukushima | G01C 21/3415 |
| 2016/0280040 A1* | 9/2016 | Connell | G05D 23/1905 |
| 2018/0281812 A1 | 10/2018 | Tochioka et al. | |
| 2020/0234191 A1 | 7/2020 | Murahashi | |
| 2020/0282791 A1* | 9/2020 | Lalwani | B60G 17/016 |

FOREIGN PATENT DOCUMENTS

| | | |
|---|---|---|
| WO | 2017/213064 A1 | 12/2017 |
| WO | 2019/077685 A1 | 4/2019 |

\* cited by examiner

VEHICLE SYSTEM

CROSS-REFERENCE TO RELATED APPLICATIONS

The present application claims priority from Japanese Patent Application No. 2019-173942 filed on Sep. 25, 2019, the entire contents of which are hereby incorporated by reference.

BACKGROUND

The disclosure relates to a vehicle system.

In the recent years, there is a technique for providing a vehicle with vehicle characteristics in accordance with a driver's habit or preference. Another technique is also disclosed as follows. To reduce a load on a driver, vehicle characteristics are categorized, a model representing the vehicle characteristics is learnt for each category, and traveling is controlled in accordance with the model for each category (see, for example, International Publication No. 2017/213064).

SUMMARY

An aspect of the disclosure provides a vehicle system including an information storage, an information acquirer, a vehicle characteristics extractor, and a vehicle characteristics transmitter. The information storage is configured to store vehicle information of a plurality of sample vehicles in association with the plurality of sample vehicles. The vehicle information is obtained by combining either or both of a traveling location and a traveling environment with vehicle characteristics. The information acquirer is configured to acquire (1) a plurality of pieces of vehicle information of a target vehicle that is a vehicle for which vehicle characteristics corresponding to either or both of a traveling location and a traveling environment are lacking and (2) either or both of the traveling location and the traveling environment for which the vehicle characteristics are lacking. The vehicle characteristics extractor is configured to determine, from among the plurality of sample vehicles, a sample vehicle of which vehicle information matches the vehicle information of the target vehicle and extract vehicle characteristics of the sample vehicle, which correspond to either or both of the traveling location and the traveling environment for which the vehicle characteristics for the target vehicle are lacking. The vehicle characteristics transmitter is configured to transmit the extracted vehicle characteristics to the target vehicle.

An aspect of the disclosure provides a vehicle system including circuitry. The circuitry is configured to store vehicle information of a plurality of sample vehicles in association with the plurality of sample vehicles. The vehicle information is obtained by combining either or both of a traveling location and a traveling environment with vehicle characteristics. The circuitry is configured to acquire (1) a plurality of pieces of vehicle information of a target vehicle that is a vehicle for which vehicle characteristics corresponding to either or both of a traveling location and a traveling environment are lacking and (2) either or both of the traveling location and the traveling environment for which the vehicle characteristics are lacking. The circuitry is configured to determine, from among the plurality of sample vehicles, a sample vehicle of which vehicle information matches the vehicle information of the target vehicle and extract vehicle characteristics of the sample vehicle, which correspond to either or both of the traveling location and the traveling environment for which the vehicle characteristics for the target vehicle are lacking. The circuitry is configured to transmit the extracted vehicle characteristics to the target vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

Vehicle characteristics of a vehicle can be determined on the basis of a traveling location and a traveling environment through a learning function. The learning function, however, cannot derive the vehicle characteristics if the vehicle has never traveled in a target traveling location or a traveling environment, that is, if no information for such condition has been input for the learning function.

In a traveling location or a traveling environment in which the vehicle travels for the first time as above, the vehicle characteristics are not determined, and a driver is not provided with appropriate vehicle characteristics.

It is desirable to provide a vehicle system that enables traveling with appropriate vehicle characteristics.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle System 100

Figure 1:
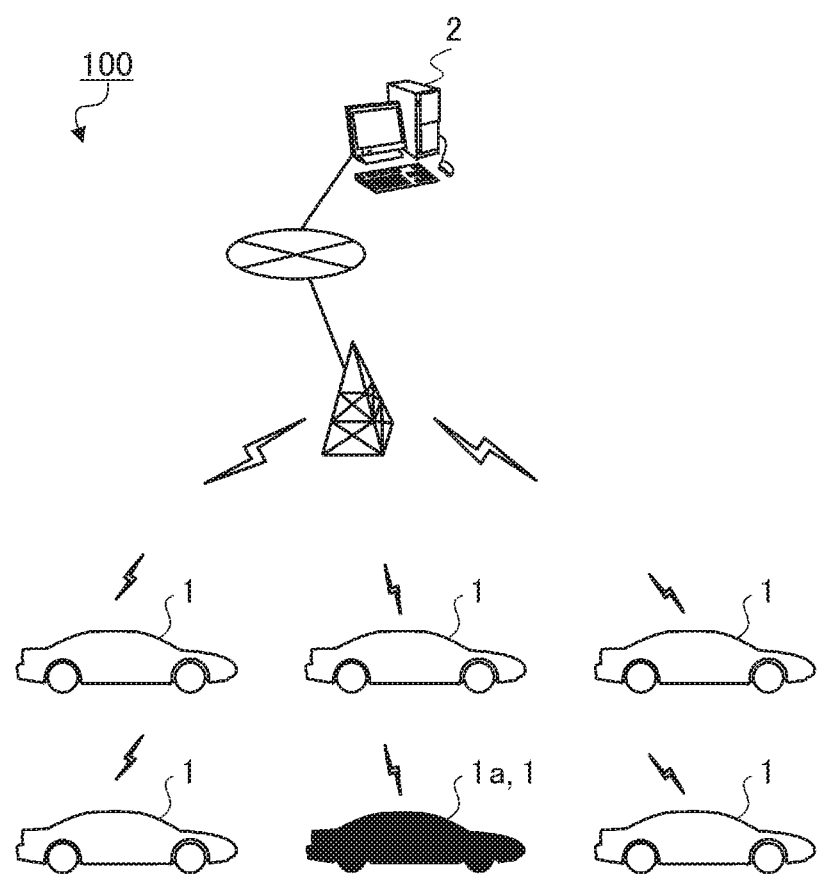
FIG. 1 is a block diagram for describing a vehicle system.

FIG. 1 is a block diagram for describing a vehicle system 100. The vehicle system 100 includes a plurality of vehicles 1 and a server 2. Each of the vehicles 1 can implement vehicle characteristics in accordance with a driver's habit or preference. The vehicle 1 can also automatically derive vehicle characteristics in accordance with a driver's habit or preference through machine learning of such vehicle characteristics.

As an example of such a learning function, either or both of a traveling location and a traveling environment in which a vehicle 1 has actually traveled may be input for a model, and actually employed vehicle characteristics may be output for a model. Herein, the traveling location indicates, for example, the location in which the vehicle 1 is currently traveling, such as urban area, highway, slope, unpaved road, straight road, or curve. The traveling environment indicates, for example, a traveling situation, such as season, time slot, weather, or traffic condition. The vehicle characteristics indicate, for example, adjustable characteristics of the vehicle 1, such as prioritized acceleration, prioritized fuel economy, brake strength, suspension strength, power-steering strength, transmission mode, or air-conditioning strength.

However, a vehicle 1a may not have traveled in a target traveling location before, or even if the vehicle 1a has traveled in the target traveling location, the number of samples may be small. Similarly, the vehicle 1a may not have traveled in a traveling environment at the time, or even if the vehicle 1a has traveled in the traveling environment, the number of samples may be small. In this manner, if little or no information for such condition has been input for the learning function, appropriate vehicle characteristics for the vehicle 1a are not derived, and a driver is forced to manually adjust the vehicle characteristics.

Thus, in this embodiment, for the traveling location or the traveling environment, for which the number of samples is small, another vehicle 1 for which the driver's habit or preference is similar is determined, and the vehicle characteristics of the vehicle 1 is set for the vehicle 1a.

For example, the server 2 successively collects vehicle information of a sample vehicle that is a sample among the vehicles 1. The vehicle information is obtained by combining either or both of a traveling location and a traveling environment with vehicle characteristics. Herein, f the vehicle 1a has never traveled in a traveling location or a traveling environment and cannot derive corresponding vehicle characteristics, the server 2 extracts, from the collected vehicle information, the vehicle characteristics that the vehicle 1a cannot derive. The server 2 then applies the vehicle characteristics to the vehicle 1a. The vehicle 1a sets the acquired vehicle characteristics. In this manner, the vehicle 1a can travel with appropriate vehicle characteristics.

Hereinafter, configurations of the vehicle 1 and the server 2 for achieving such a purpose will be described in detail. Herein, an implementation of extracting vehicle characteristics, which is characteristic to this embodiment, will be described in detail, and configurations irrelevant to the characteristics of the embodiment will be omitted from description.

Vehicle 1

Figure 2:
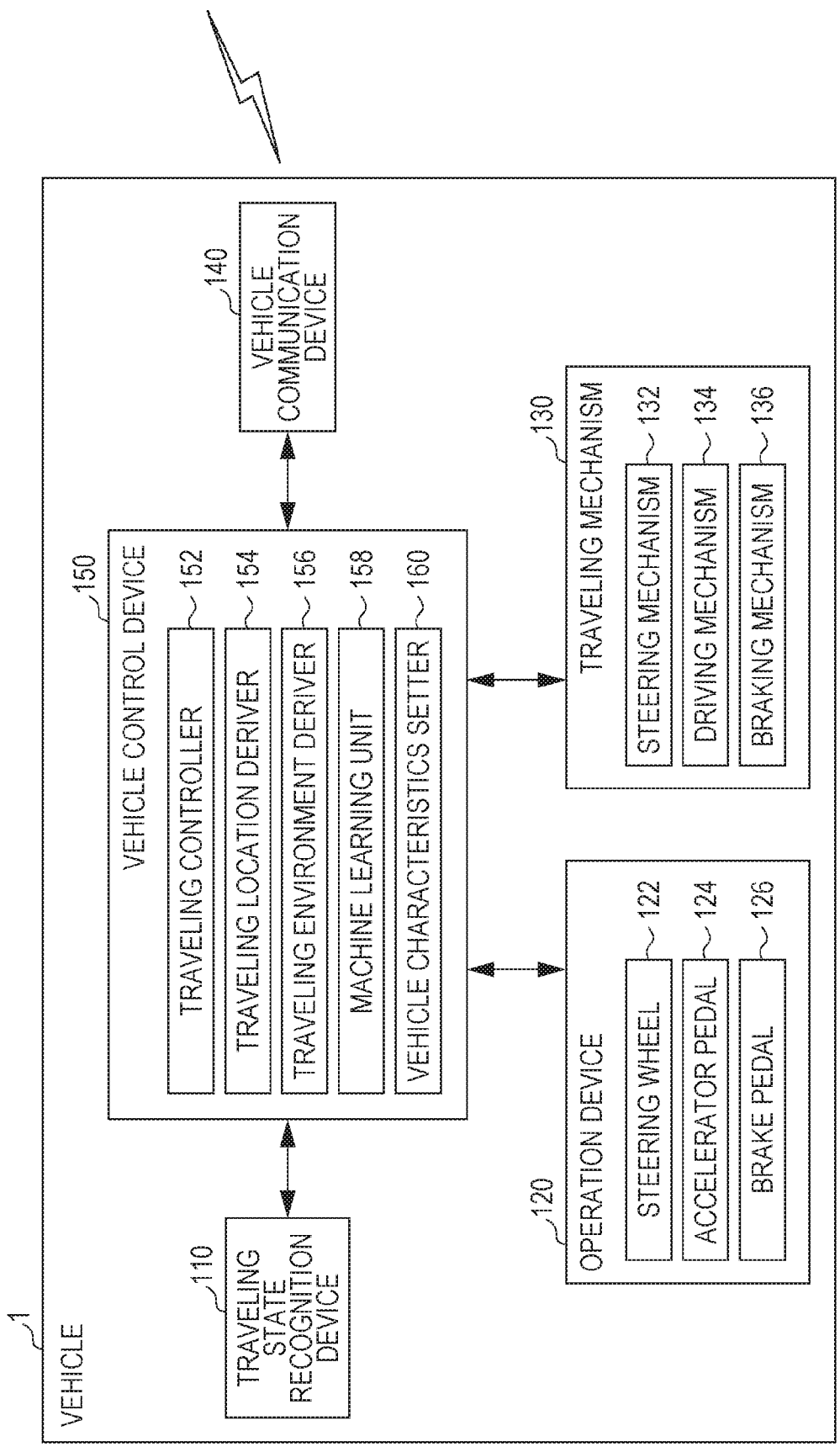
FIG. 2 is a block diagram illustrating a configuration of a vehicle.

FIG. 2 is a block diagram illustrating a configuration of the vehicle 1. The vehicle 1 includes a traveling state recognition device 110, an operation device 120, a traveling mechanism. 130, a vehicle communication device 140, and a vehicle control device (electronic control unit (ECU)) 150.

The traveling state recognition device 110 acquires a traveling state of the vehicle 1 through, for example, an imaging device, a car navigation device, a global positioning system (GPS) device, an inertial measurement unit (IMU), any of various sensors, or the like.

The operation device 120 accepts the driver's operation input through a steering wheel 122, an accelerator pedal 124, a brake pedal 126, or the like. The traveling mechanism 130 supports traveling of the vehicle 1 through a steering mechanism. 132, a driving mechanism 134, a braking mechanism 136, or the like.

For example, the steering mechanism 132 mainly controls a steering angle of wheels in accordance with an operation input through the steering wheel 122. The driving mechanism 134 mainly controls a rotational speed of an engine in accordance with an operation input through the accelerator pedal 124. The braking mechanism 136 mainly controls a braking force of the vehicle 1 in accordance with an operation input through the brake pedal 126.

The vehicle communication device 140 can perform wireless communication with an external device, such as the server 2 or another vehicle 1. The vehicle control device 150 is constituted by a semiconductor integrated circuit including a central processing unit (CPU), a read-only memory (ROM) storing a program and the like, a random access memory (RAM) as a work area, and the like. By working in cooperation with the program, the vehicle control device 150 also functions as a traveling controller 152, a traveling location deriver 154, a traveling environment deriver 156, a machine learning unit 158, and a vehicle characteristics setter 160.

For example, on the basis of an image captured by the imaging device as the traveling state recognition device 110, the traveling controller 152 determines a three-dimensional object, such as a preceding vehicle, located ahead of the vehicle 1. On the basis of the position or velocity of such a three-dimensional object and the driver's operation input to the operation device 120, the traveling controller 152 controls the traveling mechanism 130. The traveling controller 152 can also control the vehicle 1 so as to avoid collision with the three—dimensional object (collision avoiding control) or to keep a safe distance from the preceding vehicle (adaptive cruise control).

The traveling location deriver 154 derives, through the traveling state recognition device 110, a traveling location in which the vehicle 1 is currently traveling. The traveling environment deriver 156 derives, through the traveling state recognition device 110, a traveling environment in which the vehicle 1 is currently traveling.

The machine learning unit 158 successively acquires (learns) vehicle information obtained by combining either or both of the traveling location and the traveling environment, in which the vehicle 1 has actually traveled, with the vehicle characteristics employed in that case.

The vehicle characteristics setter 160 transmits the vehicle information, acquired (learnt) by the machine learning unit 158, in association with an identifier for identifying the vehicle 1, to the server 2 through the vehicle communication device 140. The server 2 collects the vehicle information as samples. The vehicle 1 may be referred to as "sample vehicle" in transmitting the vehicle information as a sample.

If the vehicle 1 travels in a traveling location or a traveling environment in which the vehicle 1 has never traveled before, in order to obtain corresponding vehicle characteristics, the vehicle characteristics setter 160 establishes communication with the server 2. Then, the server 2 transmits the vehicle characteristics corresponding to the traveling location or the traveling environment to the vehicle 1, and the vehicle characteristics setter 160 sets the received vehicle characteristics for the vehicle 1. Thus, the vehicle 1 may be referred to as "target vehicle" in that the server 2 applies the vehicle characteristics thereto.

Note that the target vehicle may also serve as a sample vehicle because the target, vehicle can transmit the set vehicle characteristics to the server 2. That is, typically, the vehicle 1 as a sample vehicle transmits vehicle information to the server 2 and, as necessary, as a target vehicle acquires vehicle characteristics from the server 2.

Server 2

Figure 3:
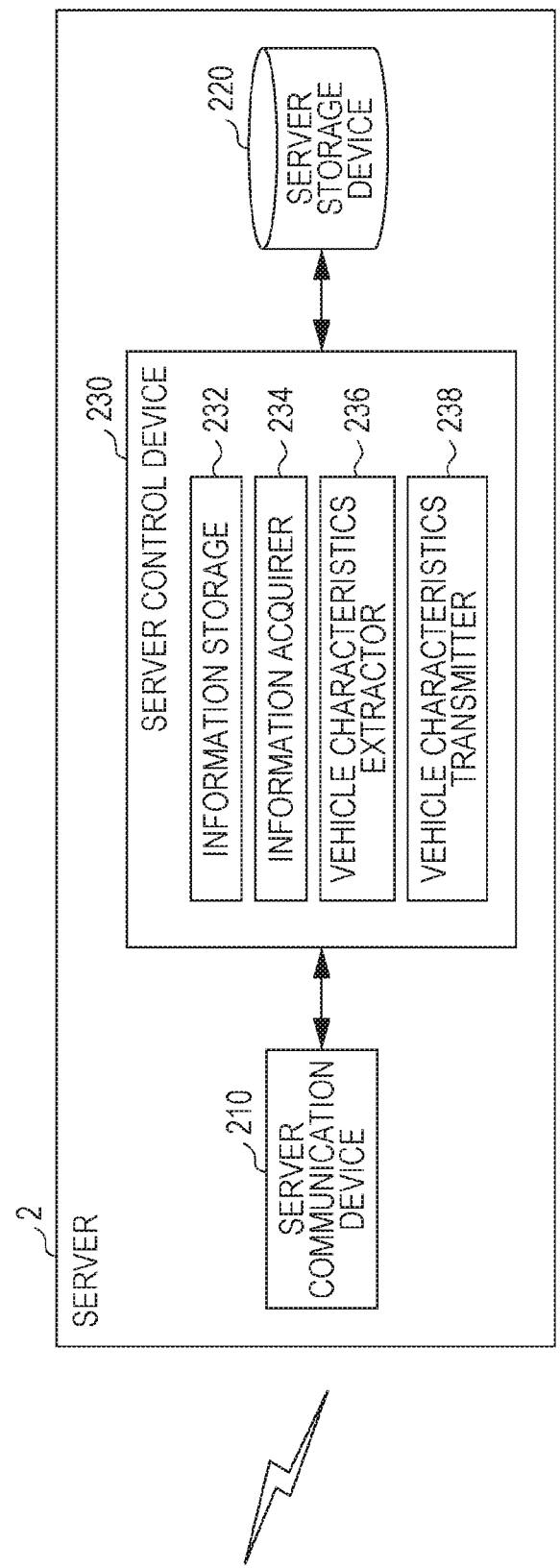
FIG. 3 is a block diagram illustrating a configuration of a server.

FIG. 3 is a block diagram illustrating a configuration of the server 2. The server 2 includes a server communication device 210, a server storage device 220, and a server control device 230. In addition, the server 2 may be a stand-alone computer or a cloud computer, which is a virtual stand-alone computer obtained by connecting a plurality of computers to each other via a network.

The server communication device 210 can perform wireless communication with an external device, such as a vehicle 1. The server storage device 220 is constituted by a RAM, a flash memory, a hard disk drive (HDD), or the like and stores various kinds of information that is necessary for the following functional units to perform processes.

The server control device 230 is constituted by a semiconductor integrated circuit including a CPU, a ROM storing a program and the like, a RAF as a work area, and the like. By working in cooperation with the program, the server control device 230 also functions as an information storage 232, an information acquirer 234, a vehicle characteristics extractor 236, and a vehicle characteristics transmitter 238.

Each time vehicle information is acquired from any of the plurality of vehicles 1 (sample vehicles) through the server communication device 210, the information storage 232 stores the vehicle information in the server storage device 220 in association with the vehicle 1 identified by the identifier associated with the vehicle information. Thus, a plurality of pieces of vehicle information are associated with each vehicle 1.

The information acquirer 234 acquires, from a target vehicle, which is a vehicle 1 for which vehicle characteristics corresponding to either or both of a traveling location and a traveling environment are lacking, either or both of the traveling location and the traveling environment for which the vehicle characteristics are lacking.

Note that the target vehicle is typically functioning also as a sample vehicle, and thus, vehicle information thereof, other than vehicle information in which the vehicle characteristics are lacking, is supposed to be accumulated in the server storage device 220. Then, from the server storage device 220, the information acquirer 234 acquires a plurality of pieces of vehicle information associated with the target vehicle. Herein, if the vehicle information of the target vehicle is not accumulated in the server storage device 220, the information acquirer 234 may acquire, from the target vehicle, a plurality of pieces of vehicle information at once together with either or both of the traveling location and the traveling environment for which the vehicle characteristics are lacking.

The vehicle characteristics extractor 236 determines, from among the plurality of sample vehicles stored in the server storage device 220, a sample vehicle of which vehicle information matches the vehicle information of the target vehicle and extracts vehicle characteristics of the determined sample vehicle, which correspond to either or both of the traveling location and the traveling environment for which the vehicle characteristics for the target vehicle are lacking.

The vehicle characteristics transmitter 238 transmits the extracted vehicle characteristics to the target vehicle. Then, upon the vehicle characteristics being received, the vehicle characteristics setter 160 sets the vehicle characteristics for the vehicle 1 (target vehicle).

Now, a vehicle characteristics collecting process and a vehicle characteristics setting process will be described with reference to flowcharts. In the vehicle characteristics collecting process, vehicle characteristics from the sample vehicles are collected through the above functional units. In the vehicle characteristics setting process, the vehicle characteristics collected in this manner are set for the target vehicle.

Vehicle Characteristics Collecting Process

Figure 4:
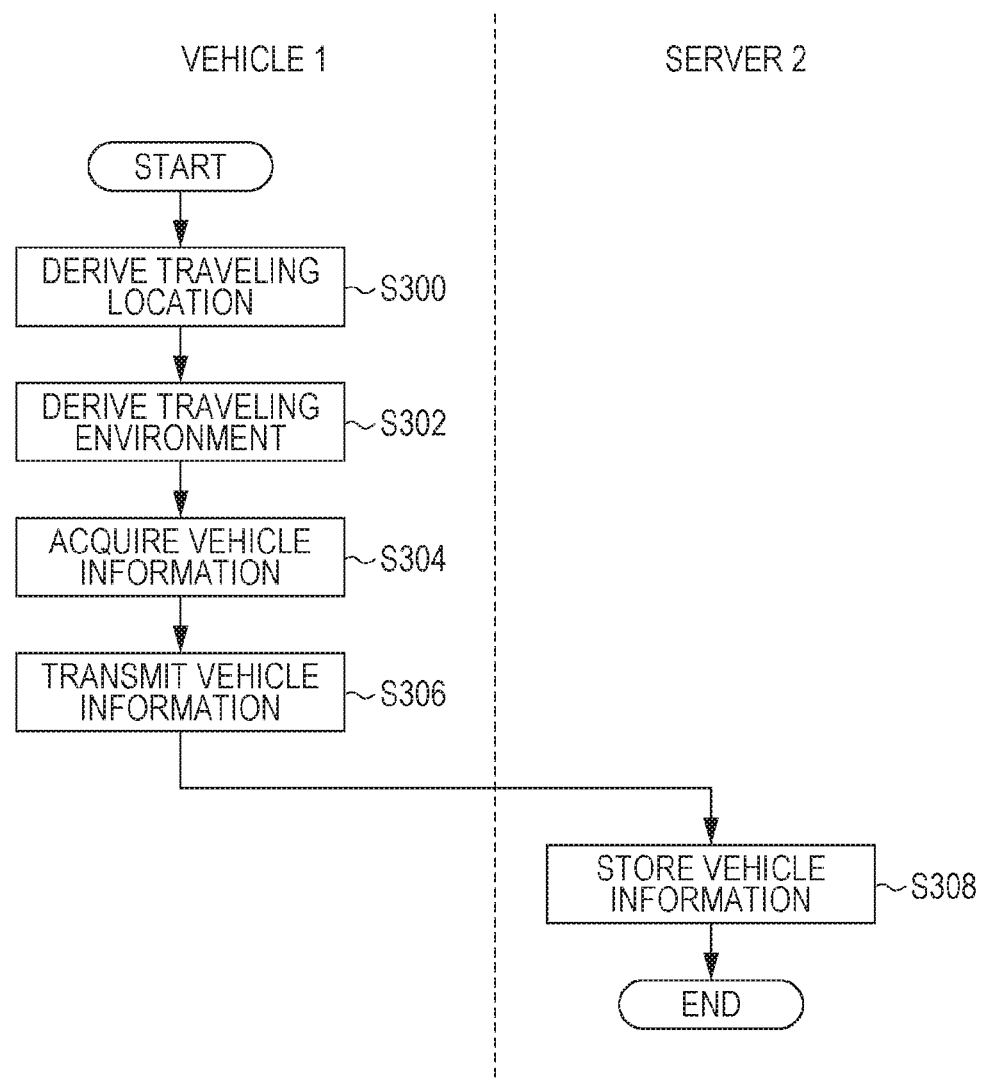
FIG. 4 is a flowchart illustrating a flow of a vehicle characteristics collecting process.
Figure 5:
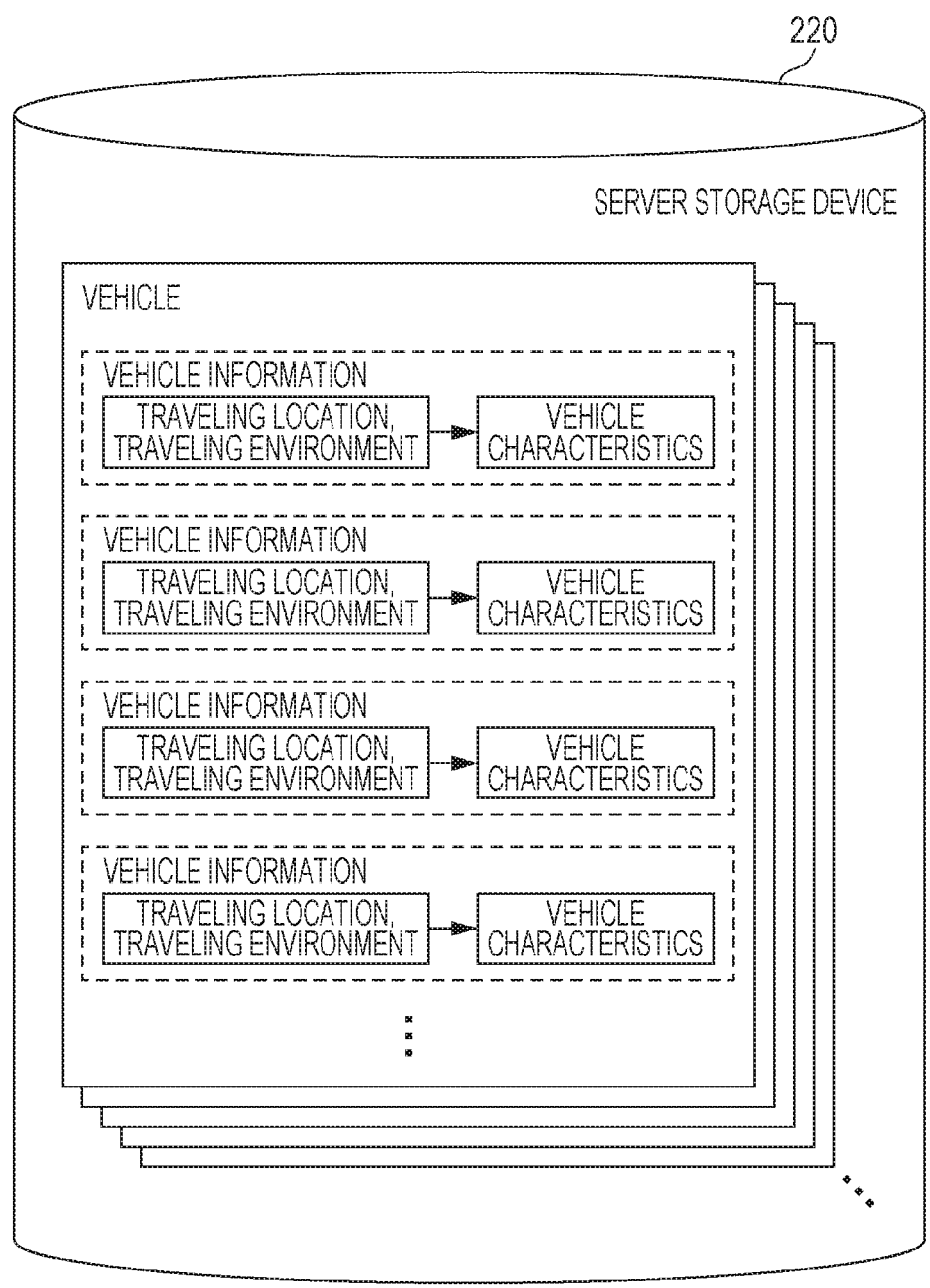
FIG. 5 is a diagram for supplementary explanation of the vehicle characteristics collecting process.

FIG. 4 is a flowchart illustrating a flow of the vehicle characteristics collecting process, and FIG. 5 is a diagram for supplementary explanation of the vehicle characteristics collecting process. Herein, the server 2 collects vehicle information (vehicle characteristics) from a vehicle 1. In one embodiment, the vehicle 1 may serve as a "sample vehicle".

While the plurality of vehicles 1 are traveling, the traveling location deriver 154 of each vehicle 1 derives a traveling location in which the vehicle 1 is currently traveling through the traveling state recognition device 110 (S300). Similarly, the traveling environment deriver 156 of each vehicle 1 derives a traveling environment in which the vehicle 1 is currently traveling through the traveling state recognition device 110 (S302).

The machine learning unit 158 of each vehicle 1 acquires vehicle information obtained by combining either or both of the traveling location and the traveling environment in which the vehicle 1 has actually traveled with vehicle characteristics employed in that, case (S304).

The vehicle characteristics setter 160 of each vehicle 1 transmits the vehicle information, acquired by the machine learning unit 158, in association with an identifier for identifying the vehicle 1, to the server 2 through the vehicle communication device 140 (S306). In this manner, a plurality of pieces of vehicle information in which traveling locations and traveling environments are different are associated with one vehicle 1 and transmitted to the server 2.

Each time the vehicle information is acquired from any of the plurality of vehicles 1, the information storage 232 of the server 2 stores the vehicle information in the server storage device 220 in association with the vehicle 1 identified by the identifier associated with the vehicle information (S308). Thus, as illustrated in FIG. 5, the server storage device 220 accumulates a plurality of pieces of vehicle information in which traveling locations and traveling environments are different in association with each of the plurality of vehicles 1.

Note that the server storage device 220 of the server 2 also stores a plurality of pieces of vehicle information for which vehicle characteristics are implemented in association with the target vehicle. In one embodiment, the target vehicle may serve as a "sample vehicle".

Vehicle Characteristics Setting Process

Figure 6:
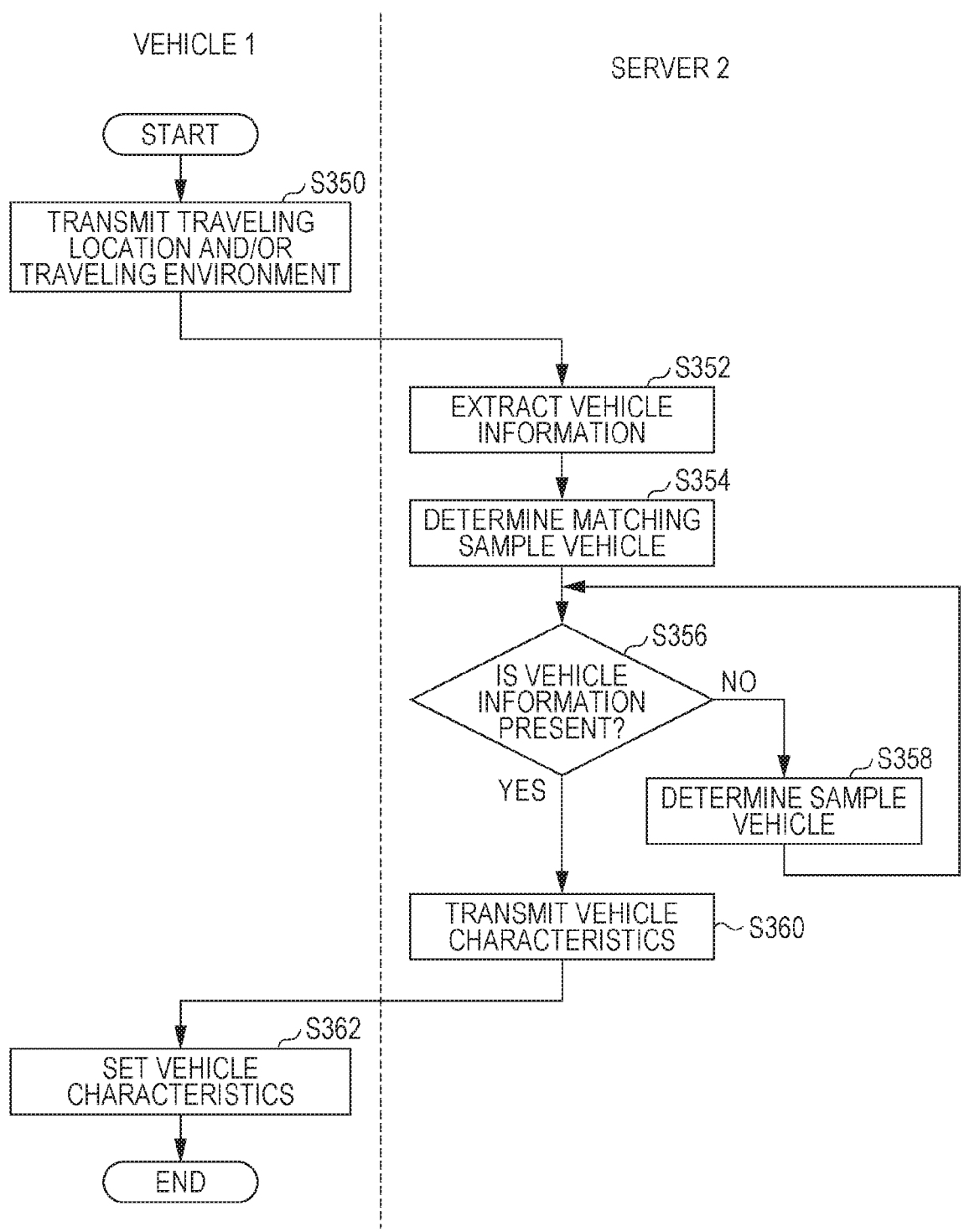
FIG. 6 is a flowchart illustrating a flow of a vehicle characteristics setting process.
Figure 7:
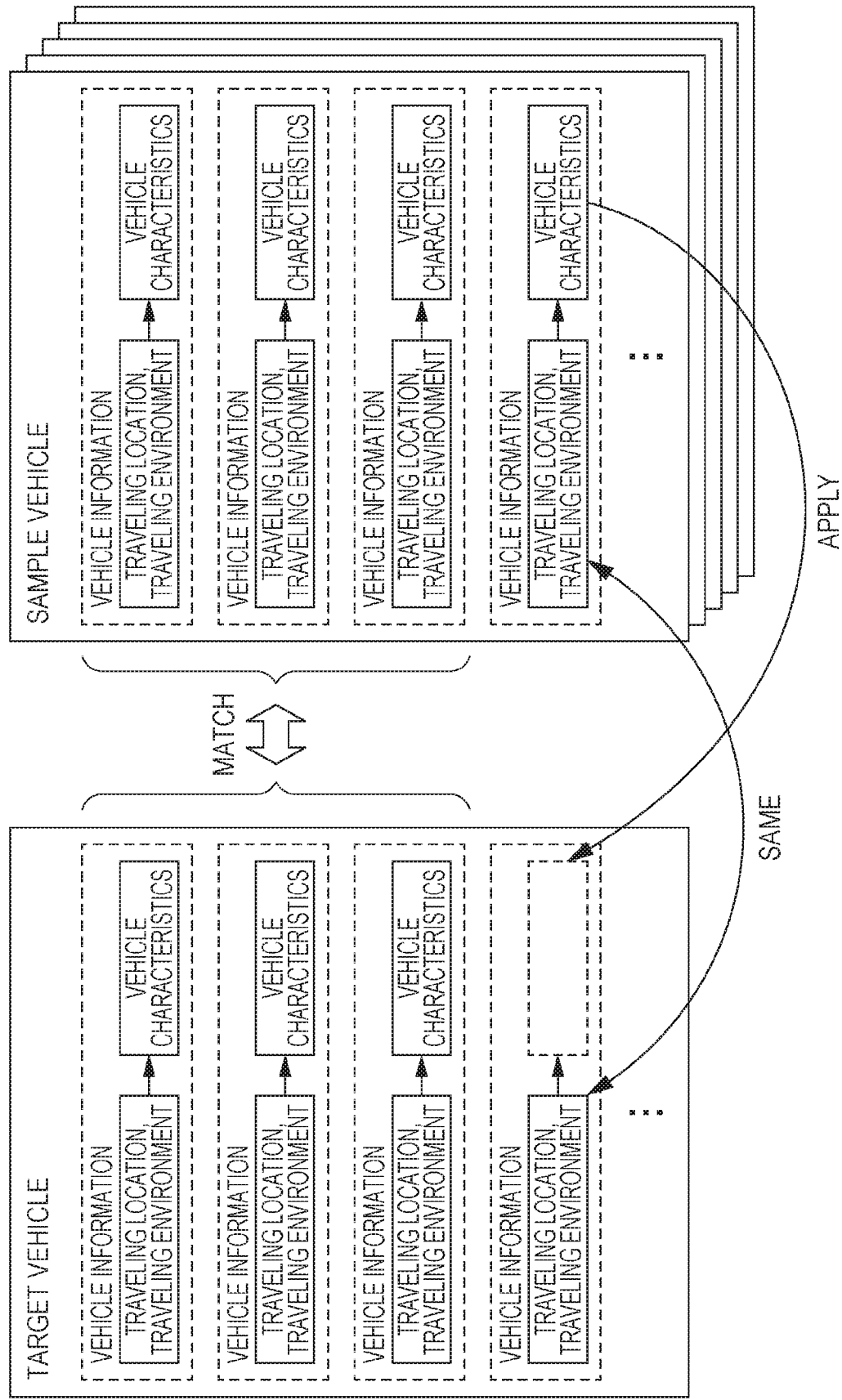
FIG. 7 is a diagram for supplementary explanation of the vehicle characteristics setting process.

FIG. 6 is a flowchart illustrating a flow of a vehicle characteristics setting process, and FIG. 7 is a diagram for supplementary explanation of the vehicle characteristics setting process. Herein, a vehicle 1 as a target vehicle travels in a traveling location and a traveling environment for the first time. Thus, vehicle characteristics corresponding to the traveling location and the traveling environment are lacking. The vehicle 1 acquires the lacking vehicle characteristics from the server 2 and sets the vehicle characteristics for the vehicle 1.

If the vehicle 1 as a target vehicle travels in a traveling location or a traveling environment in which the vehicle 1 has never traveled before, the vehicle characteristics setter 160 of the vehicle 1 transmits either or both of the traveling location and the traveling environment for which the vehicle characteristics are lacking, to the server 2 in association with an identifier of the vehicle 1 (S350).

Upon either or both of the traveling location and the traveling environment being received from the target vehicle, the information acquirer 234 of the server 2 extracts a plurality of pieces of vehicle information associated with the identifier of the vehicle 1 from the server storage device 220 (S352). Thus, as illustrated in FIG. 7, the plurality of pieces of vehicle information of the target vehicle and either or both of the traveling location and the traveling environment for which the vehicle characteristics are lacking are prepared.

As illustrated in FIG. 7, the vehicle characteristics extractor 236 compares (matches) the plurality of pieces of vehicle information of the target vehicle with a plurality of pieces of vehicle information of the plurality of sample vehicles to determine a sample vehicle that matches the target vehicle (S354). Herein, depending on whether a set of the plurality of pieces of vehicle information of the target vehicle and a set of the plurality of pieces of vehicle information of a sample vehicle correspond with each other, a matching degree that represents the degree of matching is derived.

Subsequently, the vehicle characteristics extractor 236 determines whether there is vehicle information of a sample vehicle with the highest matching degree corresponding to either or both of the traveling location and the traveling environment acquired from the target vehicle (whether the same vehicle information as the vehicle information of the target vehicle is present) (S356). As a result, if the vehicle information is not present (NO in S356), the vehicle characteristics extractor 236 determines a sample vehicle with the second highest matching degree (S358), and processing from S356 is repeated.

If either or both of the traveling location and the traveling environment acquired from the target vehicle are present (YES in S356), as illustrated in FIG. 7, the vehicle characteristics transmitter 238 transmits the derived vehicle characteristics to the target vehicle to set the vehicle characteristics for the target vehicle (S360).

In the above manner, it is possible to determine a sample vehicle of which vehicle information corresponding to either or both of the traveling location and the traveling environment acquired from the target vehicle is present and of which the matching degree is the highest among the existing sample vehicles, that is, the driver's habit or preference is similar to that of the target vehicle.

Upon the vehicle characteristics being received from the server 2, the vehicle characteristics setter 160 of the vehicle 1 sets the vehicle characteristics for the vehicle 1 (S362). Note that the vehicle characteristics may be automatically set or may be set in response to the driver's instruction.

The above configuration enables, even if the vehicle 1 travels in a traveling location or a traveling environment for the first time, setting of vehicle characteristics of sample vehicle of which the driver's habit or preference is similar to that of the target vehicle. This enables the driver to travel with appropriate vehicle characteristics.

There are also provided a program for causing a computer to function as the vehicle system 100 and a storage medium having the program stored therein, such as a computer-readable flexible disk, a magneto-optical disk, a ROM, a compact disc (CD), a digital versatile disc (DVD), or a Blu-ray disc (BD). The program in this case refers to a data processing unit described in any language and any description method.

Although the embodiment of the present disclosure has been described above with reference to the attached drawings, the present disclosure is not limited to the above embodiment. It is obvious to a person skilled in the art that various modifications and revisions are possible within the scope defined in the claims, and such modifications and revisions are to be included in the technical scope of the disclosure as a matter of fact.

For example, in the above embodiment, the vehicle characteristics extractor 236 determines a sample vehicle with the highest matching degree, and if either or both of the traveling location and the traveling environment for which the vehicle characteristics for the target vehicle are lacking is not present for the determined sample vehicle, the vehicle characteristics extractor 236 determines a sample vehicle with the second highest matching degree. However, if the traveling location or the traveling environment in which the target vehicle is traveling is particular, determination of a sample vehicle may be unlimitedly repeated to extract a sample vehicle with a low matching degree. Therefore, the number of sample vehicles to be determined or the matching degree may be limited so as to determine a sample vehicle with a relatively high matching degree.

In addition, in the above embodiment, each time the vehicle information is acquired from any of the plurality of vehicles 1, the information storage 232 of the server 2 stores the vehicle information in the server storage device 220 in association with a vehicle 1 determined by an identifier associated with the vehicle information. However, the information storage 232 may store the vehicle information in association with, not only the vehicle 1, but also a vehicle model, a vehicle type (e.g., sport utility vehicle (SUV) or four-wheel drive (4WD)), a driving source (engine or motor), or the like.

Furthermore, in the above embodiment, functional units such as the traveling location deriver 154, the traveling environment deriver 156, and the machine learning unit 158 are disposed in the vehicle 1, and functional units such as the information storage 232, the information acquirer 234, and the vehicle characteristics extractor 236 are disposed in the server 2. However, without limitation to this case, the functional units may be disposed in any of the vehicle 1 or the server 2.

Note that the steps in the vehicle characteristics collecting process and the vehicle characteristics setting process herein are not necessarily performed in the orders illustrated in the flowcharts. The steps may also be performed concurrently or may include sub—routine processing.

The server control device 230 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the server control device 230 including the information storage 232, the information acquirer 234, the vehicle characteristics extractor 236, and the vehicle characteristics transmitter 238. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle system comprising:
an information storage configured to store vehicle information of a plurality of sample vehicles in association with the plurality of sample vehicles, the vehicle information being obtained by combining either or both of a traveling location and a traveling environment with adjustable vehicle characteristics corresponding to either or both of the traveling location and the traveling environment of the plurality of sample vehicles;
a communication device configured to communicate with a first vehicle; and
at least one processor configured to:
 receive a first information from the first vehicle via the communication device, the first information is obtained by combining either or both of a first traveling location of the first vehicle and a first traveling environment of the first vehicle with adjustable vehicle characteristics of the first vehicle corresponding to either or both of the first traveling location and the first traveling environment of the first vehicle;
 receive a second information from the first vehicle via the communication device, the second information includes either or both of a second traveling location and a second traveling environment in which the first vehicle has never traveled, the second information lacking adjustable vehicle characteristics of the first vehicle corresponding to either or both of the second traveling location and the second traveling environment in which the first vehicle has never traveled;
 in response to receiving the first and second information, select a second vehicle from among the plurality of sample vehicles by:
  determining a first sample vehicle that has the highest matching degree of the vehicle information between the first information among the plurality of sample vehicles, the highest matching degree corresponding to either or both of the first traveling location and the first traveling environment acquired from the second vehicle,
  determining whether the vehicle information of the first sample vehicle includes adjustable vehicle characteristics corresponding to the second information received from the first vehicle, the adjustable vehicle characteristics being one or more of prioritized acceleration, prioritized fuel economy, brake strength, suspension strength, power-steering strength, transmission mode, and air-conditioning strength,
  in a case where the first sample vehicle includes the adjustable vehicle characteristics corresponding to the second information received from the first vehicle, selecting the first sample vehicle as the second vehicle,
  in a case where the first sample vehicle does not include the adjustable vehicle characteristics corresponding to the second information received from the first vehicle, (i) determining another sample vehicle with a next highest matching degree of the vehicle information, (ii) determining whether the vehicle information of the another sample vehicle includes the adjustable vehicle characteristics corresponding to the second information received from the vehicle, (iii) in a case where the another sample vehicle does not include the adjustable vehicle characteristics corresponding to the second information received from the first vehicle, repeating (i) and (ii) until a second sample vehicle is determined that includes adjustable vehicle characteristics corresponding to the second information received from the vehicle, and (iv) selecting the another sample vehicle or the second sample vehicle that includes the adjustable vehicle characteristics corresponding to the second information received from the first vehicle as the second vehicle; and
 transmit the adjustable vehicle characteristics of the second vehicle corresponding to the second information to the first vehicle via the communication device.

2. A vehicle system comprising:
circuitry configured to
 store vehicle information of a plurality of sample vehicles in association with the plurality of sample vehicles, the vehicle information being obtained by combining either or both of a traveling location and a traveling environment with adjustable vehicle characteristics corresponding to either or both of the traveling location and the traveling environment of the plurality of sample vehicles,
 communicate with a first vehicle,
 receive a first information from the first vehicle, the first information is obtained by combining either or both of a first traveling location of the first vehicle and a first traveling environment of the first vehicle with adjustable vehicle characteristics of the first vehicle corresponding to either or both of the first traveling location and the first traveling environment of the first vehicle;
 receive a second information from the first vehicle, the second information includes either or both of a second traveling location and a second traveling environment in which the first vehicle has never traveled, the second information lacking adjustable vehicle characteristics of the first vehicle corresponding to either or both of the second traveling location and the second traveling environment in which the first vehicle has never traveled;
 in response to receiving the first and second information, select a second vehicle from among the plurality of sample vehicles by:
  determining a first sample vehicle that has the highest matching degree of the vehicle information between the first information among the plurality of sample vehicles, the highest matching degree corresponding to either or both of the first traveling location and the first traveling environment acquired from the second vehicle,
  determining whether the vehicle information of the first sample vehicle includes adjustable vehicle characteristics corresponding to the second information received from the first vehicle, the adjustable vehicle characteristics being one or more of prioritized acceleration, prioritized fuel economy, brake strength, suspension strength, power-steering strength, transmission mode, and air-conditioning strength,
  in a case where the first sample vehicle includes the adjustable vehicle characteristics corresponding to the second information received from the first vehicle, selecting the first sample vehicle as the second vehicle, in a case where the first sample vehicle does not include the adjustable vehicle characteristics corresponding to the second information received from the first vehicle, (i) determining another sample vehicle with a next highest matching degree of the vehicle information, (ii) determining whether the vehicle information of the another sample vehicle includes the adjustable vehicle characteristics corresponding to the second information received from the vehicle, (iii) in a case where the another sample vehicle does not include the adjustable vehicle characteristics corresponding to the second information received from the first vehicle, repeating (i) and (ii) until a second sample vehicle is determined that includes adjustable vehicle characteristics corresponding to the second information received from the vehicle, and (iv) selecting the another sample vehicle or the second sample vehicle that includes the adjustable vehicle characteristics corresponding to the second information received from the first vehicle as the second vehicle; and transmit the adjustable vehicle characteristics of the second vehicle corresponding to the second information to the first vehicle.

3. The vehicle system of claim 1, wherein the plurality of sample vehicles includes the first vehicle, and wherein the second vehicle is a different vehicle from the first vehicle.

4. The vehicle system according to claim 2, wherein the plurality of sample vehicles includes the first vehicle, and wherein the second vehicle is a different vehicle from the first vehicle.

\* \* \* \* \*